US012776063B2

(12) United States Patent
Minamino et al.

(10) Patent No.: US 12,776,063 B2
(45) Date of Patent: Oct. 27, 2026

(54) SYSTEM AND METHODS FOR HEAD-MOUNTED DISPLAY TRACKING

(71) Applicant: SONY INTERACTIVE ENTERTAINMENT INC., Tokyo (JP)

(72) Inventors: Takanori Minamino, Kanagawa (JP); Masaki Uchida, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 259 days.

(21) Appl. No.: 18/560,947

(22) PCT Filed: May 13, 2022

(86) PCT No.: PCT/JP2022/020149
§ 371 (c)(1),
(2) Date: Nov. 15, 2023

(87) PCT Pub. No.: WO2022/255058
PCT Pub. Date: Dec. 8, 2022

(65) Prior Publication Data

US 2024/0273758 A1 Aug. 15, 2024

(30) Foreign Application Priority Data

Jun. 4, 2021 (JP) ................................ 2021-094484

(51) Int. Cl.
*G06T 7/73* (2017.01)
*A63F 13/211* (2014.01)
(Continued)

(52) U.S. Cl.
CPC ................ *G06T 7/73* (2017.01); *A63F 13/26* (2014.09); *G06F 3/1454* (2013.01);
(Continued)

(58) Field of Classification Search
CPC ...... A63F 13/211; A63F 13/213; A63F 13/26; A63F 13/27; A63F 13/428; A63F 13/65;
(Continued)

(56) References Cited

U.S. PATENT DOCUMENTS

2018/0005387 A1* 1/2018 Lee ...................... H04N 19/182
2021/0124174 A1* 4/2021 Tokunaga ............ H04N 17/002

FOREIGN PATENT DOCUMENTS

JP 2013-535867 A 9/2013
JP 2015-095045 A 5/2015
(Continued)

OTHER PUBLICATIONS

International Search Report for corresponding international application No. PCT/JP2022/020149, dated Jul. 19, 2022, pp. 1-4.
(Continued)

*Primary Examiner* — Lawrence S Galka
(74) *Attorney, Agent, or Firm* — Kilpatrick Townsend & Stockton LLP

(57) ABSTRACT

An estimation processing unit 222 executes processing of estimating at least one of a position or a posture of a head-mounted display on the basis of an image obtained by capturing a vicinity of the head-mounted display. An image generation unit 230 generates a display image to be displayed on a display device different from the head-mounted display. The image generation unit 230 generates a display image at least partially including a picture pattern being a still image.

9 Claims, 9 Drawing Sheets

(51) Int. Cl.

| | |
|---|---|
| ***A63F 13/212*** | (2014.01) |
| ***A63F 13/213*** | (2014.01) |
| ***A63F 13/26*** | (2014.01) |
| ***G06F 3/14*** | (2006.01) |

(52) U.S. Cl.
CPC ........... *A63F 13/211* (2014.09); *A63F 13/212* (2014.09); *A63F 13/213* (2014.09)

(58) Field of Classification Search
CPC ............ A63F 2300/301; A63F 2300/69; A63F 2300/8082; G02B 2027/0138; G02B 2027/014; G02B 2027/017; G06F 3/011; G06F 3/012; G06F 3/0346; G06F 3/1415; G06T 7/80; G09G 2320/0261; G09G 2356/00; G09G 5/36; H04N 21/4122; H04N 21/4126
See application file for complete search history.

(56) References Cited

FOREIGN PATENT DOCUMENTS

| | | | |
|---|---|---|---|
| JP | 2016-048851 | A | 4/2016 |
| JP | 2021056783 | A | 4/2021 |
| WO | 2020/017327 | A1 | 1/2020 |

OTHER PUBLICATIONS

JP2021-094484, "Notice of Decision to Grant," Aug. 5, 2025, 3 pages.

* cited by examiner

130

(a)

(b)

SYSTEM AND METHODS FOR HEAD-MOUNTED DISPLAY TRACKING

TECHNICAL FIELD

The present disclosure relates to a technology for estimating at least one of a position or a posture of a head-mounted display on the basis of an image obtained by capturing a vicinity of the head-mounted display.

BACKGROUND ART

In recent years, a user has played a game by operating a game controller while wearing a head-mounted display (hereinafter referred to as an "HMD") on a head portion and viewing a game image displayed on the HMD. A sense of immersion into a video of a game space displayed on the HMD increases by executing tracking processing for the HMD to operationally associate the video with a motion of the head portion of the user, thereby being able to increase an entertainment property of the game.

CITATION LIST

Patent Literature

[PTL 1]
Japanese Patent Laid-open No. 2015-95045

SUMMARY

Technical Problems

As the technology for estimating the position and/or the posture of the HMD, there has been known the SLAM (simultaneous localization and mapping). The SLAM is a technology for simultaneously estimating an own position and creating an environmental map, and the position and/or the posture of the HMD can be estimated by using an image captured by a camera mounted to the HMD, to track a feature point.

In the tracking processing of the feature point, when a television set displaying a moving image exists near the HMD and the television set is included as a large part in an image captured by the camera, an effective feature point cannot be extracted, and hence, a tracking lost may occur. In particular, in a game system in which, while a game image is displayed on the HMD, the game image is also displayed on the television set, a tracking accuracy may deteriorate due to the camera mounted to the HMD capturing the game image displayed on the television set.

Thus, the present disclosure has an object of providing a technology of highly accurately estimating at least one of a position or a posture of an HMD in an environment in which a display device different from the HMD exists.

Solution to Problems

In order to solve the problems described above, an information processing device in one aspect of the present disclosure includes an estimation processing unit that executes processing of estimating at least one of a position or a posture of a head-mounted display on the basis of an image obtained by capturing a vicinity of the head-mounted display, and an image generation unit that generates a display image to be displayed on a display device different from the head-mounted display. The image generation unit generates a display image at least partially including a picture pattern being a still image.

An image generation method in another aspect of the present disclosure includes a step of executing processing of estimating at least one of a position or a posture of a head-mounted display on the basis of an image obtained by capturing a vicinity of the head-mounted display, and a step of generating a display image which is to be displayed on a display device different from the head-mounted display and at least partially includes a picture pattern being a still image.

DESCRIPTION OF EMBODIMENT

Figure 1:
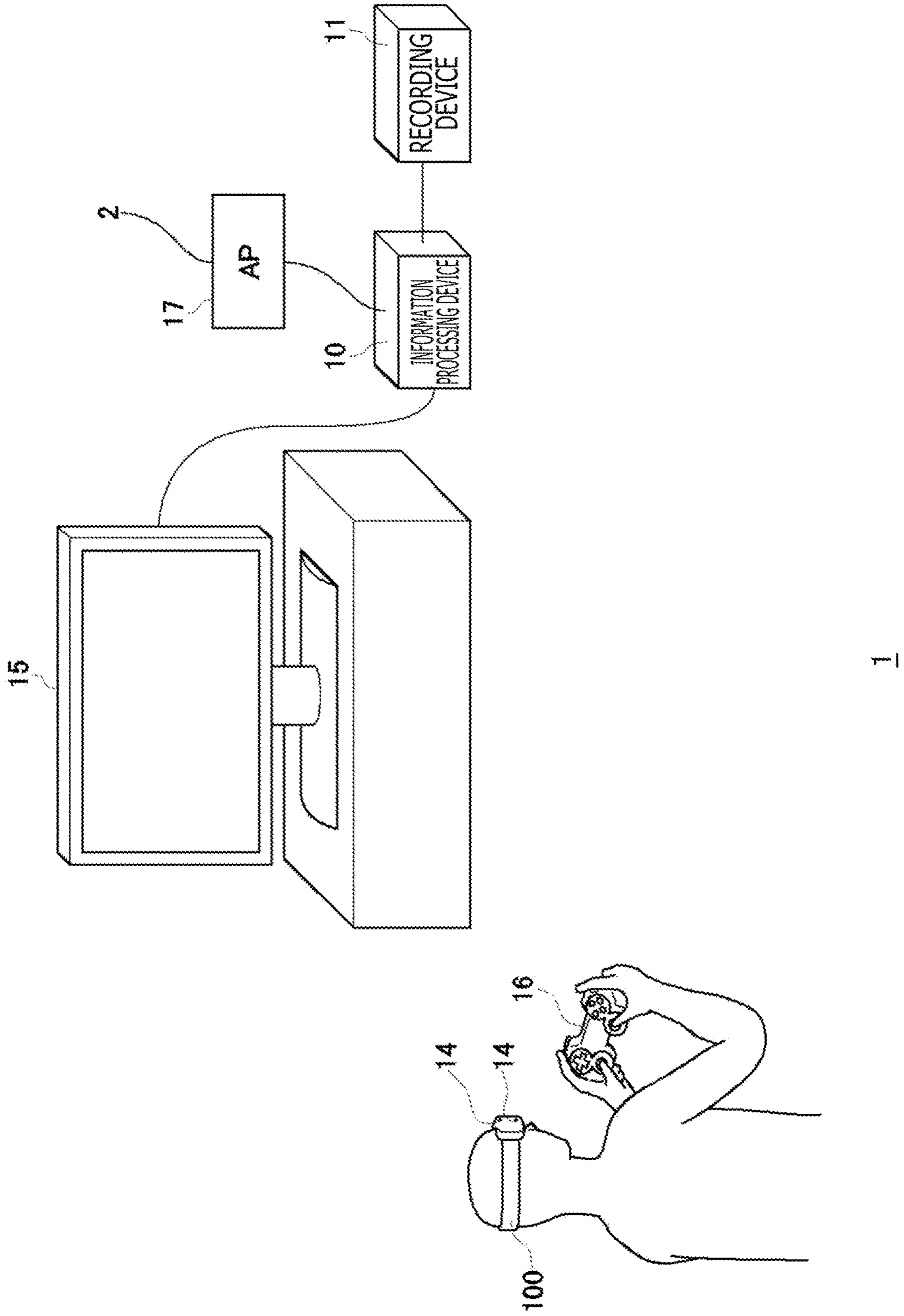
FIG. 1 is a diagram for illustrating a configuration example of an information processing system in an embodiment.

FIG. 1 illustrates a configuration example of an information processing system 1 in an embodiment. The information processing system 1 includes an information processing device 10, a recording device 11, an HMD 100, an input device 16 which is operated by the fingers of a user, and an output device 15 which outputs an image and sound. The output device 15 is a display device different from the HMD 100 and may be a stationary television set. The information processing device 10 is connected to an external network 2 such as the Internet via an AP (access point) 17. The AP 17 has functions of a wireless access point, and a router and the information processing device 10 may be connected to the AP 17 via a cable or may be connected thereto through a known wireless communication protocol.

The recording device 11 records applications such as system software and game software. The information processing device 10 may download the game software from a content server on the recording device 11 via the network 2. The information processing device 10 executes a game program to supply image data and sound data on a game to the HMD 100. The information processing device 10 may be connected to the HMD 100 through a known wireless communication protocol or may be connected via a cable.

The HMD 100 is a display device which is worn by the user on a head portion to display images on display panels positioned in front of the eyes of the user. The HMD 100 individually displays an image for the left eye on a left-eye display panel and an image for the right eye for a right-eye display panel, respectively. These images form parallax images viewed from the left and right viewpoints, thereby achieving the stereoscopy. The user views the display panels via optical lenses, and hence, the information processing device 10 provides, to the HMD 100, parallax image data optical distortion by the lenses of which is corrected.

The output device 15 is not necessary for the user wearing the HMD 100, but another user can view the display image of the output device 15 by providing the output device 15. The information processing device 10 may display, on the output device 15, the same image as the image viewed by the user wearing the HMD 100, but may display another image. For example, when the user wearing the HMD and another user together play the game, a game image from a character viewpoint of the other user may be displayed on the output device 15.

The information processing device 10 and the input device 16 may be connected to each other through a known wireless communication protocol or may be connected via a cable. The input device 16 includes a plurality of operation members such as operation buttons, and the user operates the operation members by the fingers while gripping the input device 16. The input device 16 is used as a game controller when the information processing device 10 executes the game program.

A plurality of imaging devices 14 are mounted to the HMD 100. The plurality of imaging devices 14 are attached to positions which are on a front surface of the HMD 100 and are different from one another. The imaging device 14 may include a visual light sensor such as a CCD (charge coupled device) sensor or a CMOS (complementary metal oxide semiconductor) sensor used for a general digital video camera. The plurality of imaging devices 14 capture views in front of the user at a synchronized timing and at a predetermined cycle (for example, 60 frames/second) and transmit captured images to the information processing device 10.

The information processing device 10 has a function of estimating at least one of the position or the posture of the HMD 100 on the basis of the images obtained by capturing the vicinity of the HMD 100. A description is hereinafter given while assuming that the information processing device 10 has the function of estimating both the position and the posture of the HMD 100, but it is only required for the information processing device 10 to have a function of estimating at least one of the position or the posture.

The information processing device 10 uses the captured images captured as a time series to estimate the position and the posture of the HMD 100 at a desired time (t) from the position and the posture of the HMD 100 at a time (t−1) immediately before the time (t). The information processing device 10 may derive the position of the HMD 100 as position coordinates in a coordinate system defined in the real space and may derive the posture of the HMD 100 as posture information in the coordinate system defined in the real space. Note that the information processing device 10 may further use sensor data detected by a posture sensor provided to the HMD 100 to highly accurately derive the position information and the posture information on the HMD 100.

Figure 2:
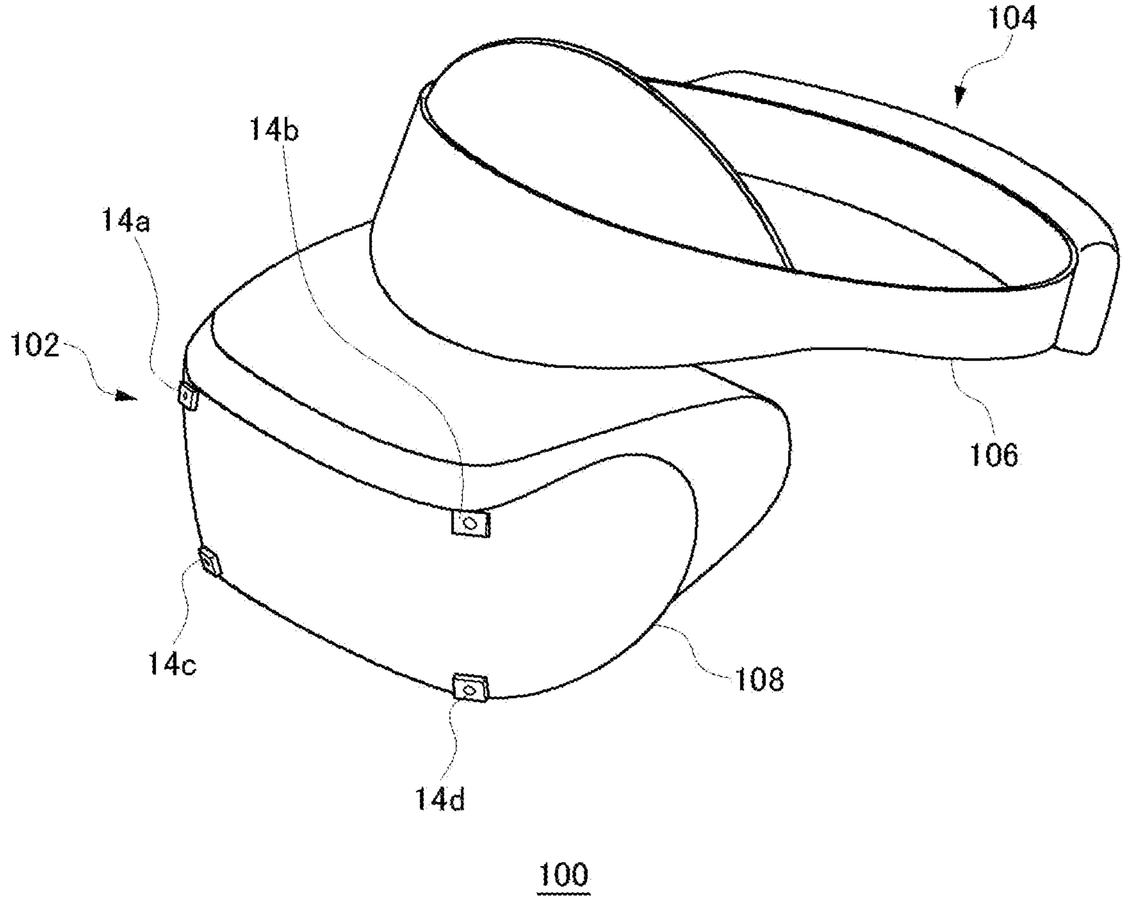
FIG. 2 is a view for illustrating an example of an exterior shape of an HMD.

FIG. 2 illustrates an example of an exterior shape of the HMD 100. The HMD 100 is formed of an output mechanism unit 102 and a wearing mechanism unit 104. The wearing mechanism unit 104 includes a wearing band 106 which runs around the head portion when the wearing band 106 is worn by the user to secure the HMD 100 to the head portion. The wearing band 106 has a material or a structure which allows adjustment of a length thereof according to a head circumference of the user.

The output mechanism unit 102 includes a housing 108 having such a shape as to cover the left and right eyes of the user wearing the HMD 100 and is internally provided with the display panels facing the eyes at the time of the wearing. The display panel may be a liquid crystal panel or an organic EL (electroluminescent) panel. Inside the housing 108 are further provided the pair of left and right optical lenses which are positioned between the display panels and the eyes of the user and increase a viewing angle of the user. The HMD 100 may further be provided with speakers or earphones at a position corresponding to the ears of the user or may be configured such that an external earphone is connected to the HMD 100.

A plurality of imaging devices 14*a*, 14*b*, 14*c*, and 14*d* are provided on an outer surface on the front side of the housing 108. With respect to the front direction of the housing 108 as a reference, the imaging device 14*a* is mounted to an upper right corner of the front-side outer surface such that a camera optical axis directs to an obliquely upper right direction, and the imaging device 14*b* is mounted to an upper left corner of the front-side outer surface such that a camera optical axis directs to an obliquely upper left direction. The imaging device 14*c* is mounted to a lower right corner of the front-side outer surface such that a camera optical axis directs to the front direction, the imaging device 14*d* is mounted to a lower left corner of the front-side outer surface such that a camera optical axis directs to the front direction, and the imaging device 14*c* and the imaging device 14*d* form a stereo camera.

The HMD 100 transmits the captured images captured by the imaging devices 14 and the sensor data detected by the posture sensor to the information processing device 10 and receives game image data and game sound data generated in the information processing device 10.

Figure 3:
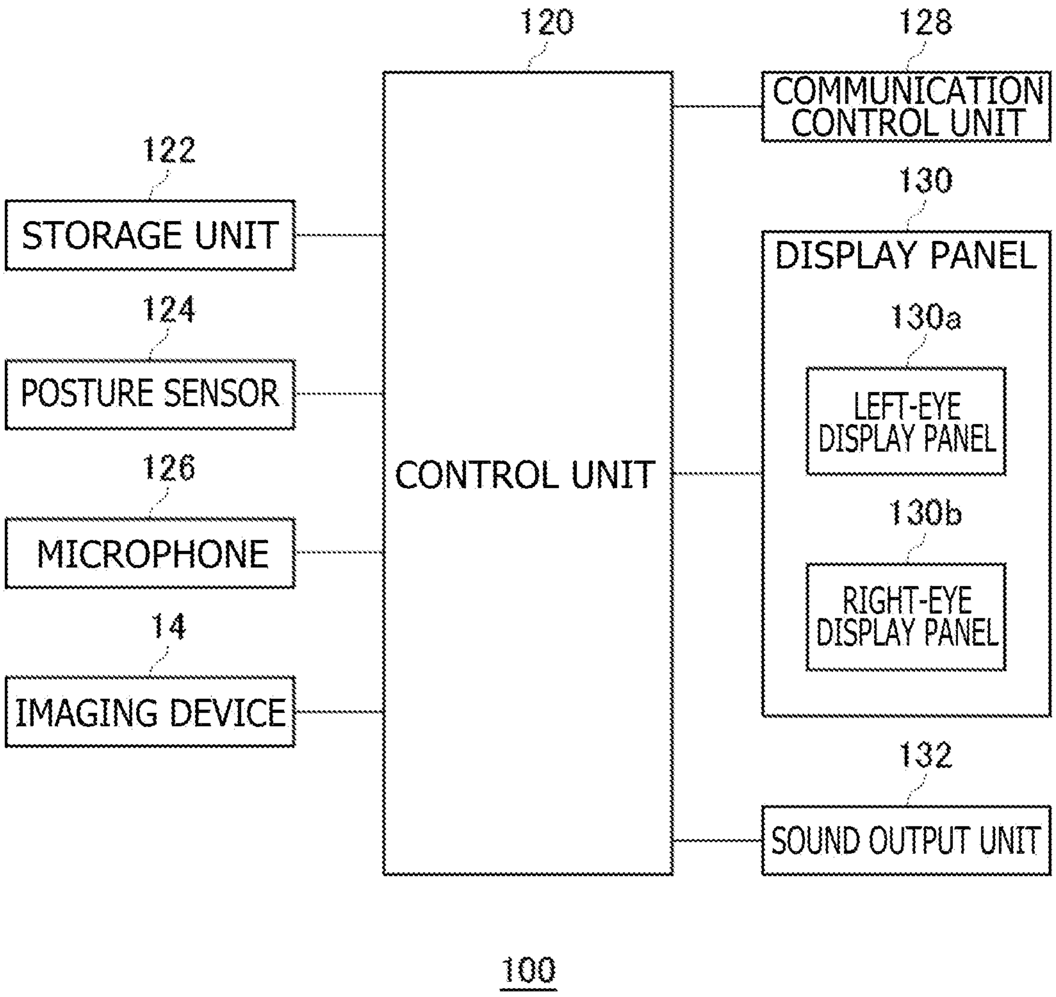
FIG. 3 is a diagram for illustrating function blocks of the HMD.

FIG. 3 illustrates function blocks of the HMD 100. A control unit 120 is a main processor which processes and outputs various types of data such as the image data, the sound data, and the sensor data and instructions. A storage unit 122 temporarily stores the data, the instructions, and the like to be processed by the control unit 120. The posture sensor 124 acquires sensor data on a motion of the HMD 100. The posture sensor 124 includes at least a three-axis acceleration sensor and a three-axis gyro sensor and detects a value of each axis component (sensor data) at a predetermined cycle (for example, 1,600 Hz).

A communication control unit 128 transmits data output from the control unit 120 to the external information processing device 10 through wired or wireless communication via a network adaptor or an antenna. Moreover, the communication control unit 128 receives data from the information processing device 10 and outputs the received data to the control unit 120.

When the control unit 120 receives the game image data and the game sound data from the information processing device 10, the control unit 120 supplies the game image data to a display panel 130 to cause the game image data to be displayed, and supplies the game sound data to the sound output unit 132 to cause the game sound data to be output as sound. The display panel 130 is formed of a left-eye display panel 130*a* and a right-eye display panel 130*b*, and a pair of parallax images are displayed on the display panels. Moreover, the control unit 120 causes the sensor data acquired by the posture sensor 124, sound data acquired by a microphone 126, and the captured images acquired by the imaging devices 14 to be transmitted from the communication control unit 128 to the information processing device 10.

Figure 4:
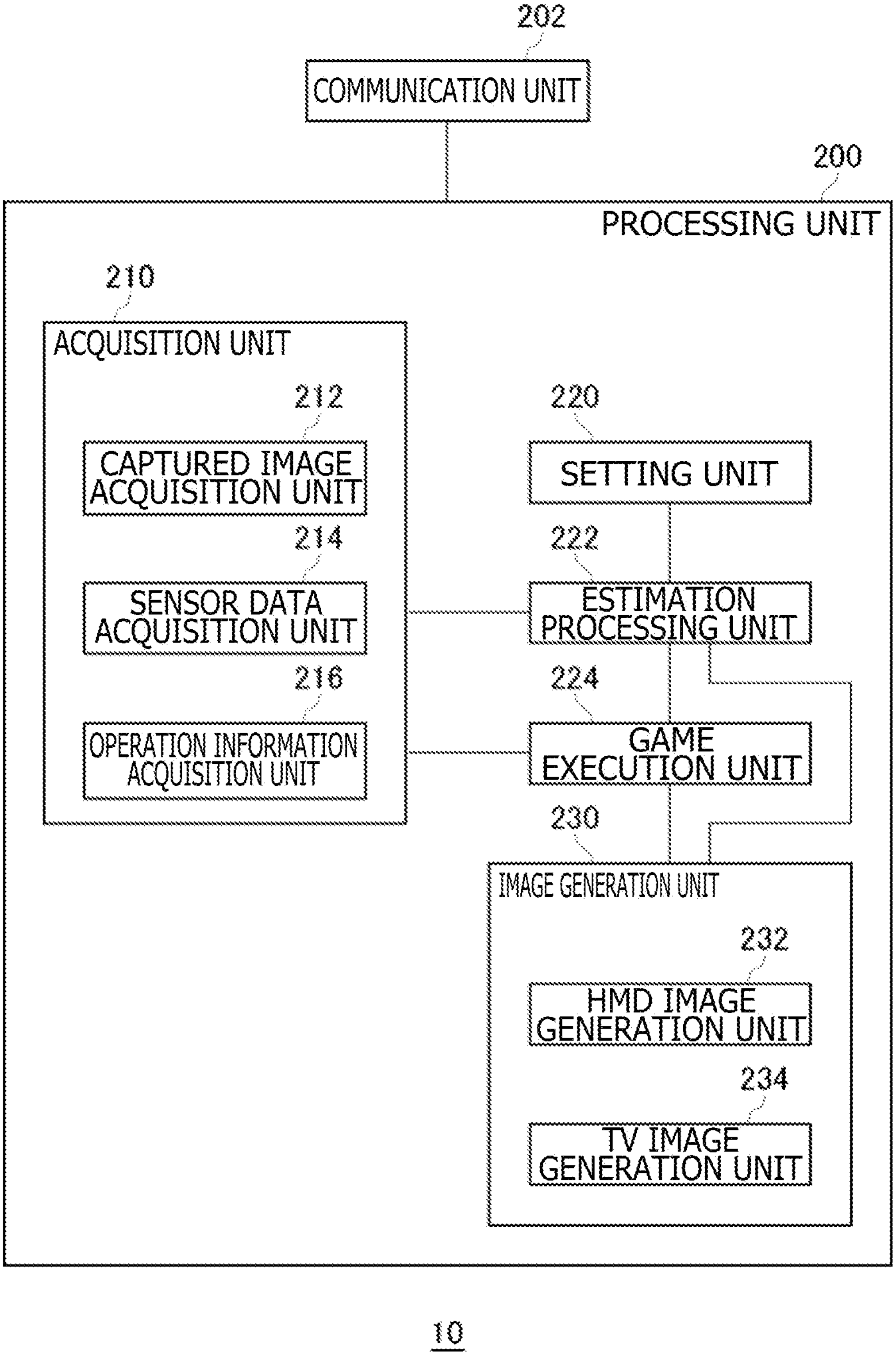
FIG. 4 is a diagram for illustrating function blocks of an information processing device.

FIG. 4 illustrates function blocks of the information processing device 10. The information processing device 10 includes a processing unit 200 and a communication unit 202, and the processing unit 200 includes an acquisition unit 210, a setting unit 220, an estimation processing unit 222, a game execution unit 224, and an image generation unit 230. The acquisition unit 210 includes a captured image acquisition unit 212, a sensor data acquisition unit 214, and an operation information acquisition unit 216, and the image generation unit 230 includes an HMD image generation unit 232 which generates the display images to be displayed on the HMD 100 and a TV (television) image generation unit 234 which generates the display image to be displayed on the output device 15.

The communication unit 202 receives operation information transmitted from the input device 16 and supplies the received operation information to the acquisition unit 210. Moreover, the communication unit 202 receives the captured images and the sensor data transmitted from the HMD 100 and supplies the captured images and the sensor data to the acquisition unit 210.

These configurations can be implemented by any processor, any memory, and other LSI (large-scale integration) circuits in terms of hardware and are implemented by a program loaded on a memory in terms of software, and function blocks implemented through cooperation therebetween are herein drawn. It will thus be understood by a person skilled in the art that these function blocks can be implemented in various forms by only the hardware, only the software, or the combination thereof.

The captured image acquisition unit 212 acquires the images obtained by capturing the vicinity of the HMD 100 and supplies the acquired images to the estimation processing unit 222. The estimation processing unit 222 executes processing of estimating the position and the posture of the HMD 100 on the basis of the captured images and supplies position information and posture information being an estimation result to the game execution unit 224. The sensor data acquisition unit 214 acquires the sensor data detected by the posture sensor 124 of the HMD 100 and supplies the acquired sensor data to the estimation processing unit 222. It is preferred that the estimation processing unit 222 use the sensor data to increase the estimation accuracies of the position information and the posture information on the HMD 100.

Before start of the game play, the user wearing the HMD 100 executes initial setting of using the imaging devices 14 to capture and register an environment around the user himself or herself. At the time of the initial setting, the user defines an area in which the user himself or herself plays (an area in which the user can move), in order to secure safety during the play. When the user is about to exit from the play area during the game play, the information processing device 10 warns the user that the user is about to exit the play area. An image of the peripheral environment registered at the time of the initial setting may periodically be updated during the game play to create the latest environmental map.

The estimation processing unit 222 acquires the images captured by the imaging devices 14 of the HMD 100 as the time series, divides each image in a form of a grid, and detects a feature point in each section thereof. The estimation processing unit 222 associates the feature point in an image captured at a time (t−1) and the feature point in an image captured at a time (t) with each other, to extract a movement amount (dx, dy) of the feature point between the two images. For example, the estimation processing unit 222 may execute block matching of the feature point through peripheral search while predicting the movement of the feature point, thereby executing tracking processing for the feature point. Note that the estimation processing unit 222 may use a known method other than this method to execute the tracking processing for the feature point. The estimation processing unit 222 highly precisely executes the tracking processing, thereby being able to highly precisely estimate the position and the posture of the HMD 100. The position information and the posture information on the HMD 100 are supplied to the game execution unit 224 and are used as input to the game.

The operation information acquisition unit 216 acquires the operation information transmitted from the input device 16 and supplies the acquired operation information to the game execution unit 224. The game execution unit 224 executes the game program on the basis of the operation information on the input device 16 and the position information and the posture information on the HMD 100, thereby executing arithmetic processing of moving a game character in a virtual space. The image generation unit 230 includes a GPU (graphics processing unit) which executes rendering processing and the like and generates the game images.

In the image generation unit 230, the HMD image generation unit 232 generates the display images to be displayed on the display panel 130 of the HMD 100, and the TV image generation unit 234 generates the display image to be displayed on the output device 15. Note that the information processing device 10 includes a sound generation unit which generates the game sound, which is not illustrated.

Figure 5:
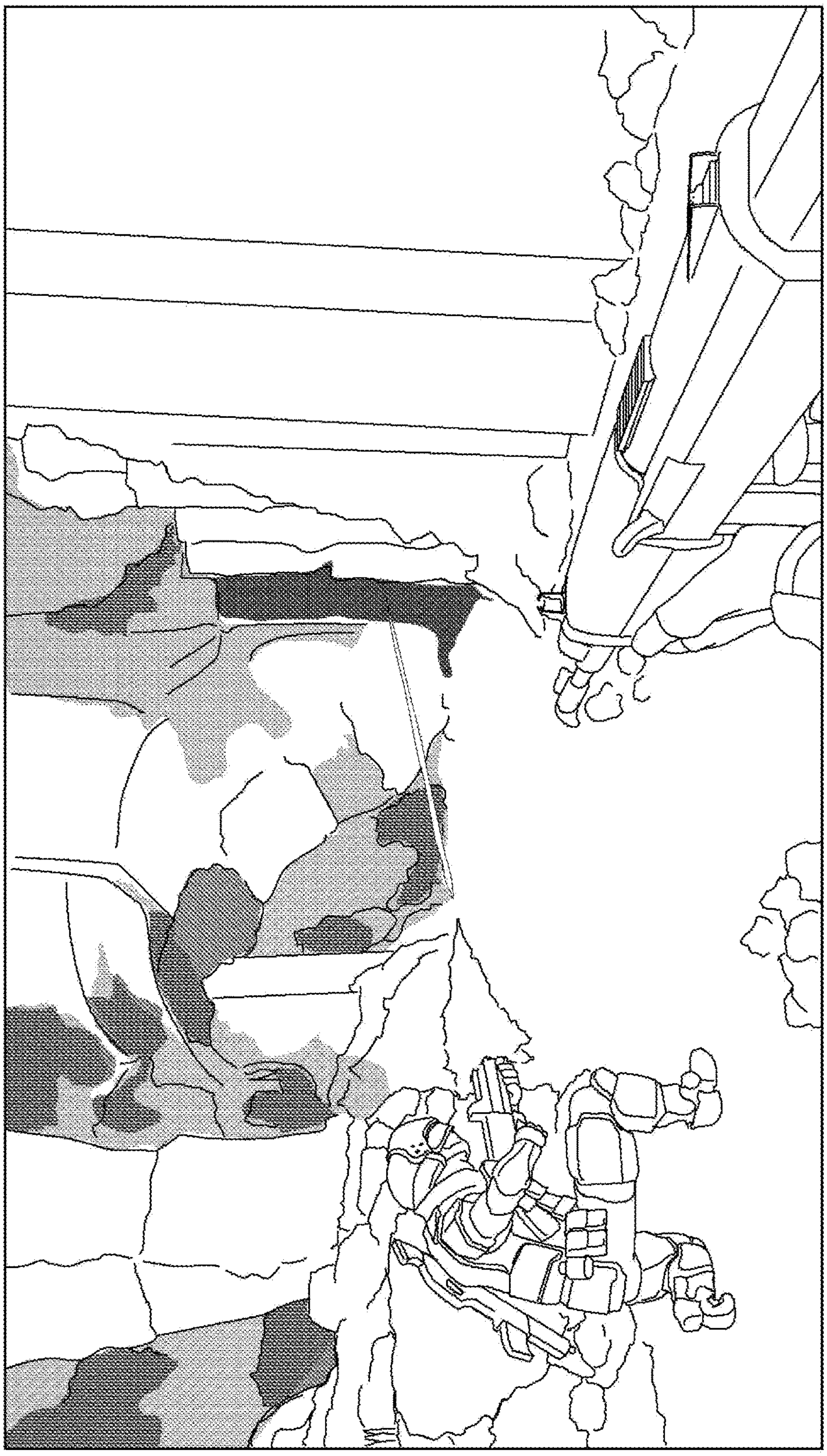
FIG. 5 is a view for illustrating an example of a display image displayed on a display panel.

FIG. 5 illustrates an example of the display image displayed on the display panel 130. The HMD image generation unit 232 generates the games image and supplies the generated game images to the display panel 130 of the HMD 100. As described above, the display panel 130 includes the left-eye display panel 130*a* and the right-eye display panel 130*b*, and the HMD image generation unit 232 generates the game image for the left eye and the game image for the right eye and supplies the game images to the left-eye display panel 130*a* and the right-eye display panel 130*b*, respectively. Each of the left-eye display panel 130*a* and the right-eye display panel 130*b* displays the game image.

The TV image generation unit 234 generates the same game image as the images generated by the HMD image generation unit 232 and supplies the generated image to the output device 15. Note that, in the information processing system 1, the user wearing the HMD 100 does not view the game image displayed on the output device 15 and the TV image generation unit 234 may generate a different game image for another user and may supply the generated game image to the output device 15.

In a case in which the user wearing the HMD 100 on the head portion is playing the game while facing a direction in which the output device 15 is installed, when a screen size of the output device 15 is large and a distance between the user and the output device 15 is short, an area of the output device 15 included in the image captured by the imaging devices 14 is large. On this occasion, the estimation processing unit 222 extracts many feature points from the game image displayed on the output device 15 and cannot associate the extracted feature points with a feature point extracted in the past, and a possibility of an occurrence of tracking lost becomes high.

Figure 6:
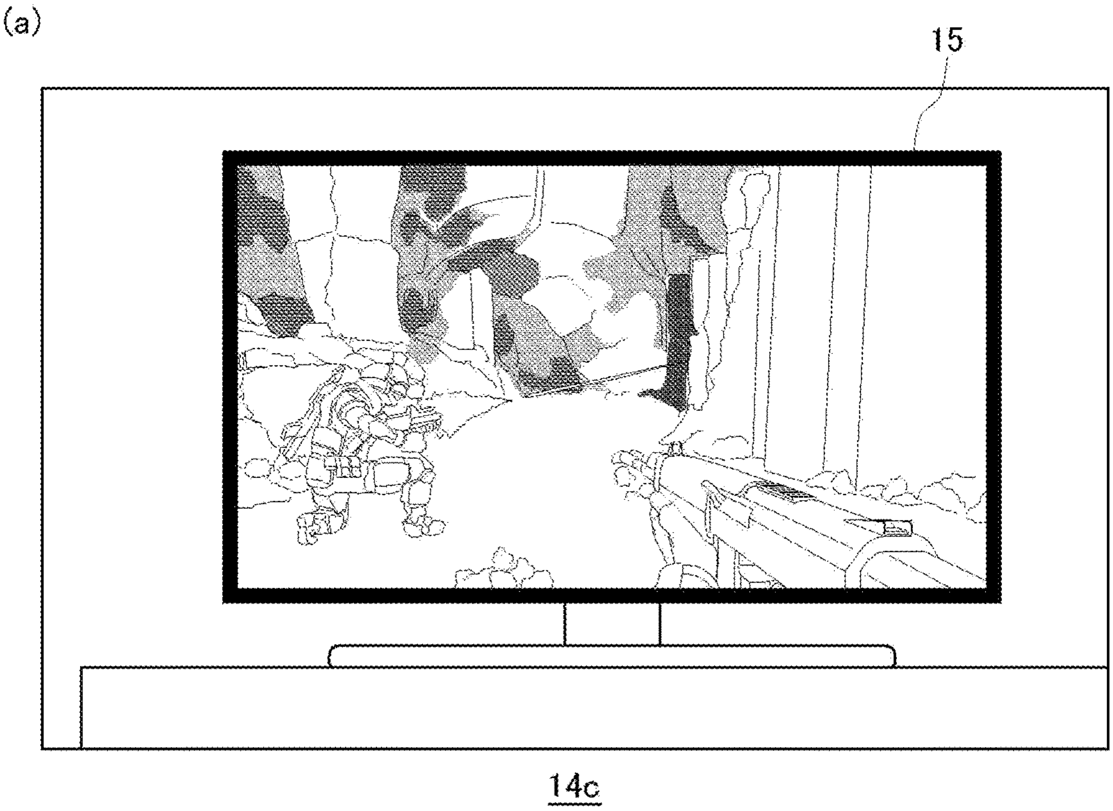
FIG. 6(*a*) and FIG. 6(*b*) are views for illustrating examples of images captured by imaging devices.
Figure 6:
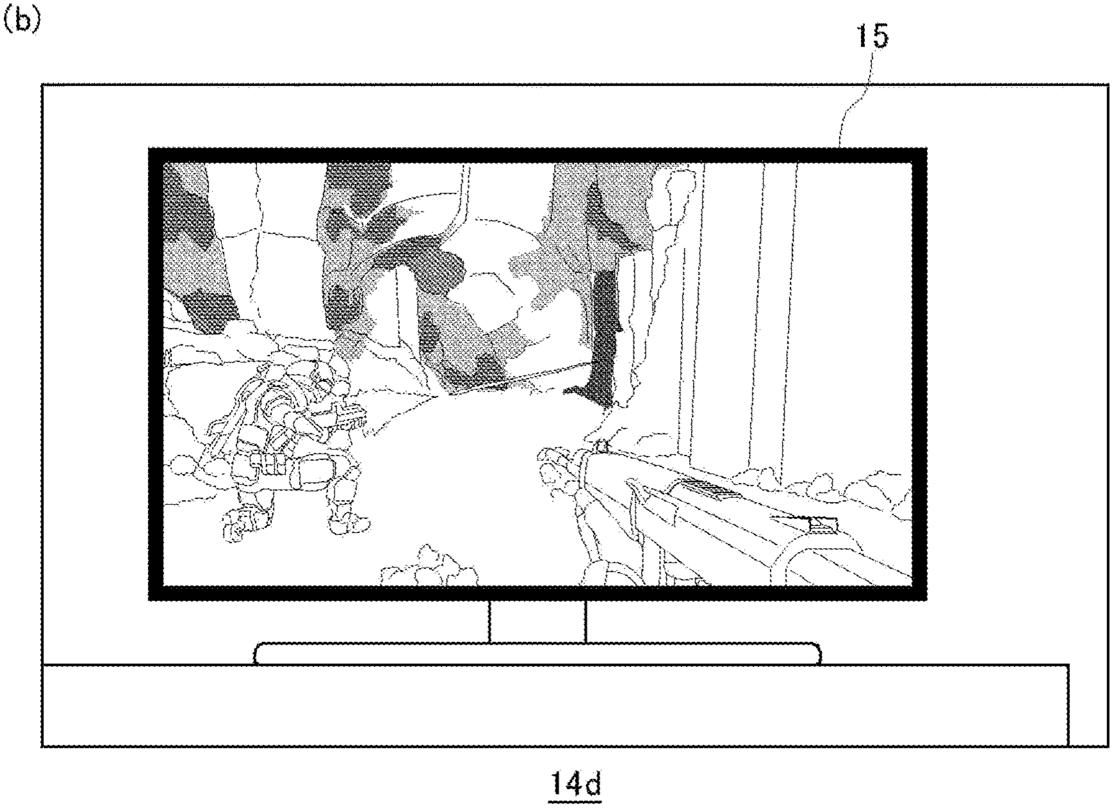

FIG. 6(*a*) illustrates an example of the image captured by the imaging device 14*c*, and FIG. 6(*b*) illustrates an example of the image captured by the imaging device 14*d*. The imaging device 14*c* and the imaging device 14*d* form the stereo camera, and hence, the captured images thereof are images slightly shifted from each other in the horizontal direction. As illustrated in FIGS. 6, the game image displayed on the output device 15 occupies a large portion of the captured images.

In the captured images illustrated in FIG. 6(*a*) and FIG. 6(*b*), ratios of the occupation of the game image illustrated on the output device 15 are very high. The game image changes moment by moment, hence it is difficult for the estimation processing unit 222 to extract an effective feature point from the captured image, and the estimation processing unit 222 may fail in the estimation processing for the position and the posture of the HMD 100.

Thus, in the information processing device 10 in the embodiment, the TV image generation unit 234 generates a display image at least partially including a picture pattern being a still image, thereby enabling the estimation processing unit 222 to extract an effective feature point for the tracking.

Figure 7:
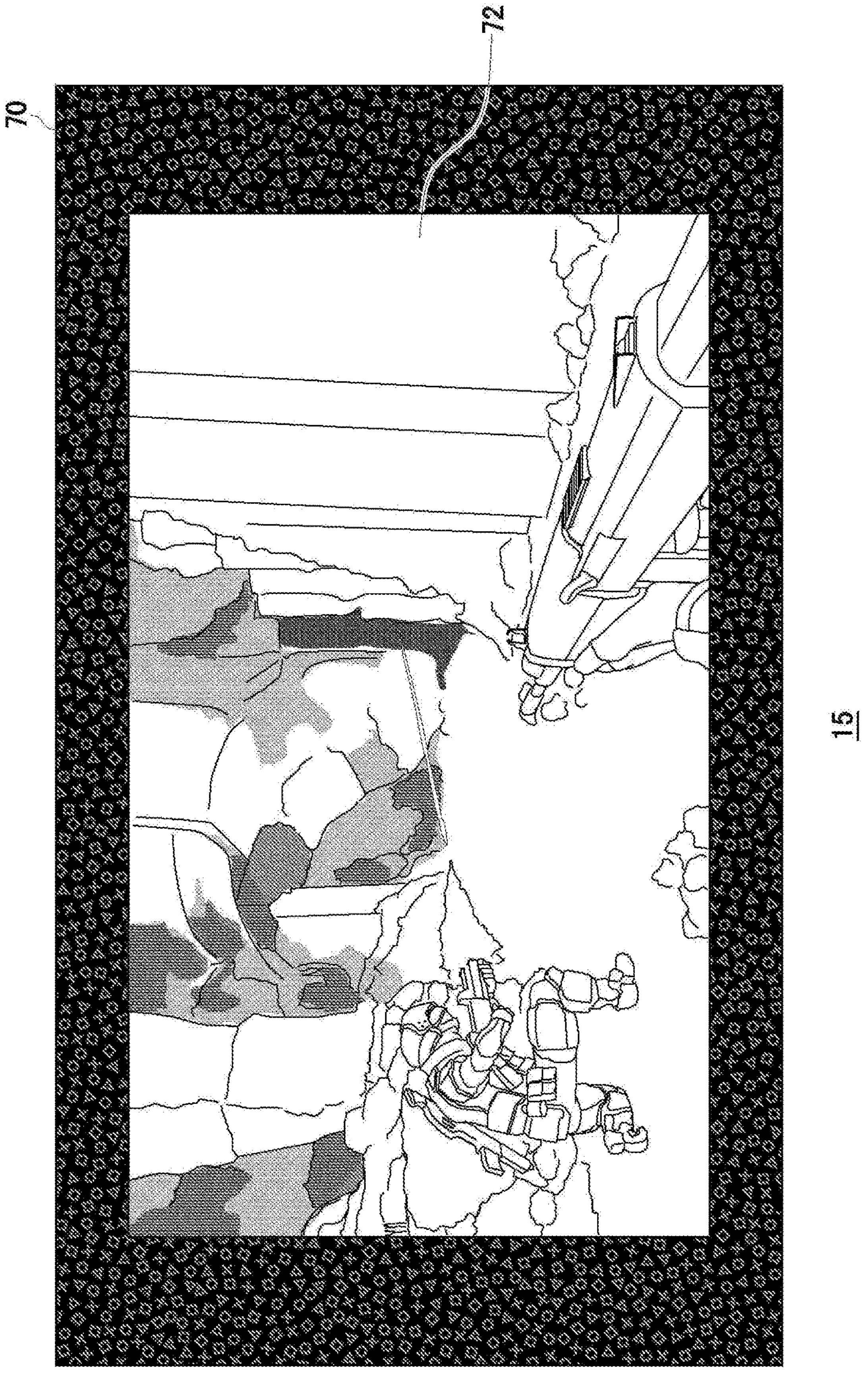
FIG. 7 is a view for illustrating an example of an image displayed on an output device.

FIG. 7 illustrates an example of the image to be displayed on the output device 15. The TV image generation unit 234 generates a display image partially including a picture pattern 70 being a still image. In this example, the TV image generation unit 234 generates a display image including the picture pattern 70 forming a frame and a game moving image 72 inside the frame and displays the generated display image on the output device 15. When the picture pattern 70 forming the rectangular frame is displayed as the still image, the estimation processing unit 222 comes to be able to extract a feature point effective for the tracking from the picture pattern 70 included in the image obtained by capturing the output device 15.

The TV image generation unit 234 may display the game moving image 72 having a reduced image size, inside the frame formed of the picture pattern 70, but the TV image generation unit 234 may not reduce the image size and may generate a display image obtained by superimposing a rectangular frame formed of the picture pattern 70 on the game moving image 72. Note that it is preferred that a region occupied by the frame be defined so as to be 50% or less of the screen size of the output device 15 in order to avoid impairment of visibility of the game moving image 72. Note that the TV image generation unit 234 may not display the picture pattern 70 as the frame, but the TV image generation unit 234 may display the picture pattern 70 as, for example, blocks at four corners of the screen of the output device 15. That is, the TV image generation unit 234 may generate a display image including the picture pattern 70 as the block images at the corners. Moreover, the TV image generation unit 234 may generate a display image including the picture pattern 70 on any one side or a plurality of sides of upper, lower, left, and right sides, and the picture pattern 70 may be displayed on the one side or the plurality of sides of the upper, lower, left, and right sides of the screen of the output device 15. In any case, the picture pattern 70 is displayed as a still image in order to support the tracking processing by the estimation processing unit 222. Note that the TV image generation unit 234 may not include the game moving image 72 in the display image and may generate a display image including the picture pattern 70 being the still image, for example, on the entire image.

The estimation processing unit 222 extracts, as the feature point, the corner portion included in the captured image, and hence, it is preferred that the picture pattern 70 be formed of a pattern having many corners. Note that it is preferred that the picture pattern 70 be configured such that the same pattern is not repeated at close positions in order to increase a tracking accuracy.

The setting unit 220 sets a picture pattern display function by the TV image generation unit 234 to be ON or OFF and sets, when the picture pattern display function is set to be ON, this function to be enabled or disabled. When the setting unit 220 sets the picture pattern function to be enabled, the TV image generation unit 234 generates a display image at least partially including the picture pattern 70 being the still image and displays the generated display image on the output device 15. When the setting unit 220 sets the picture pattern display function to be disabled, the TV image generation unit 234 does not generate the display image including the picture pattern 70.

The setting unit 220 may set the picture pattern display function by the TV image generation unit 234 to be enabled, while the estimation processing unit 222 is executing the estimation processing for the position and the posture of the HMD 100, and may set the picture pattern display function by the TV image generation unit 234 to be disabled while the estimation processing unit 222 is not executing the estimation processing. Thus, while the estimation processing unit 222 is executing the estimation processing, the TV image generation unit 234 generates the display image including the picture pattern 70, to support the tracking processing by the estimation processing unit 222. Meanwhile, while the estimation processing unit 222 is not executing the estimation processing, the TV image generation unit 234 is not required to support the tracking processing by the estimation processing unit 222 and hence does not generate the display image including the picture pattern 70. On this occasion, the TV image generation unit 234 may generate the display image including the game moving image 72 on the entire image and may output the generated display image to the output device 15.

The setting unit 220 may set the picture pattern display function by the TV image generation unit 234 to be enabled, while the user is wearing the HMD 100 on the head portion, and may set the picture pattern display function by the TV image generation unit 234 to be disabled while the user is not wearing the HMD 100 on the head portion. The absence or presence of the wearing is determined on the basis of, for example, a detection result of a proximity sensor (not illustrated) provided to the HMD 100. Thus, the TV image generation unit 234 generates the display image including the picture pattern 70 to support the tracking processing by the estimation processing unit 222 while the user is wearing the HMD 100 on the head portion. Meanwhile, the TV image generation unit 234 is not required to support the tracking processing by the estimation processing unit 222 and hence does not generate the display image including the picture pattern 70 while the user is not wearing the HMD 100 on the head portion. On this occasion, the TV image generation unit 234 may generate the display image including the game moving image 72 on the entire image and may output the generated display image to the output device 15.

Note that the setting unit 220 may set the picture pattern display function by the TV image generation unit 234 to be enabled, under such a condition that the estimation processing unit 222 is executing the estimation processing for the position and the posture of the HMD 100 and the user is wearing the HMD 100 on the head portion.

The estimation processing unit 222 may control the tracking processing such that, when the frame formed of the picture pattern 70 is recognized in the captured image, the extraction of the feature point is avoided from the game moving image 72 arranged inside this frame. Note that, when the frame formed of the picture pattern 70 is displayed on the output device 15 and the image of the frame is registered at an initial setting time, the estimation processing unit 222 may control the tracking processing such that use of a feature point at the position of this frame is avoided during the game play.

The setting of the picture pattern display function by the TV image generation unit 234 to be ON or OFF may be made by the user at the initial setting time.

Figure 8:
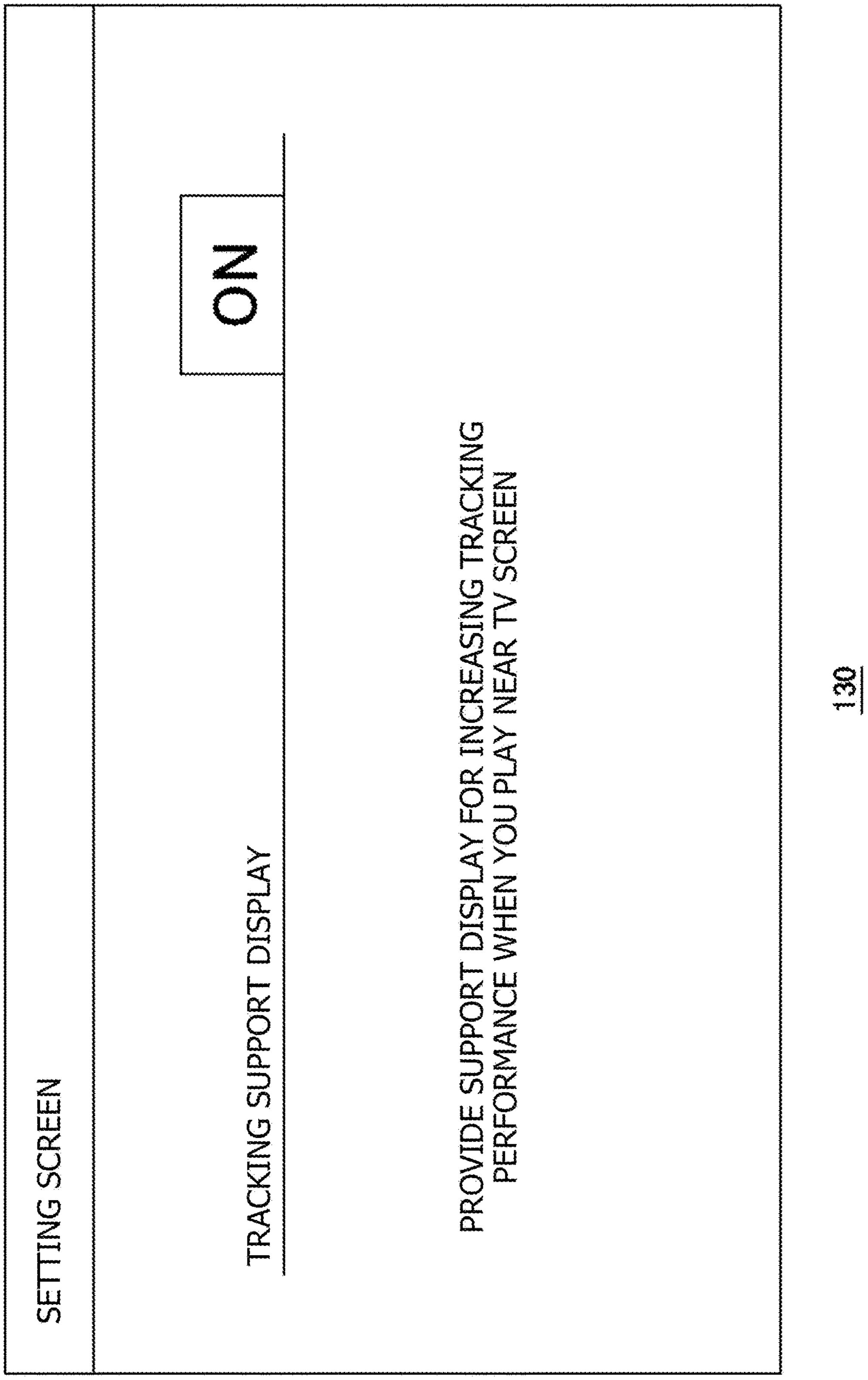
FIG. 8 is a view for illustrating an example of a setting screen for setting a picture pattern display function to be ON or OFF.

FIG. 8 illustrates an example of a setting screen for setting the picture pattern display function to be ON or OFF. This setting screen is displayed on the display panel 130 at the initial setting time. When the user sets the picture pattern display function to be ON, the setting unit 220 sets the picture pattern display function by the TV image generation unit 234 to be enabled, under such a condition that the estimation processing unit 222 is executing the estimation processing for the position and the posture of the HMD 100 and the user is wearing the HMD 100 on the head portion. As a result, the TV image generation unit 234 comes to generate the display image including the picture pattern 70. Meanwhile, when the user sets the picture pattern display function to be OFF, the setting unit 220 sets the picture pattern display function by the TV image generation unit 234 to be disabled.

Note that, when the picture pattern display function is set to be OFF, the estimation processing unit 222 may fail in the estimation processing for the position and the posture of the HMD 100 using the image obtained by capturing the game image displayed on the entire screen of the output device 15. When the estimation processing fails, the setting unit 220 may automatically change the picture pattern display function by the TV image generation unit 234 to the ON setting, thereby setting the picture pattern display function to be enabled.

Note that the setting unit 220 may not automatically change the picture pattern display function to the ON setting, but the HMD image generation unit 232 may generate a display image including an option for setting the picture pattern display function to be enabled and may display the generated display image on the display panel 130.

Figure 9:
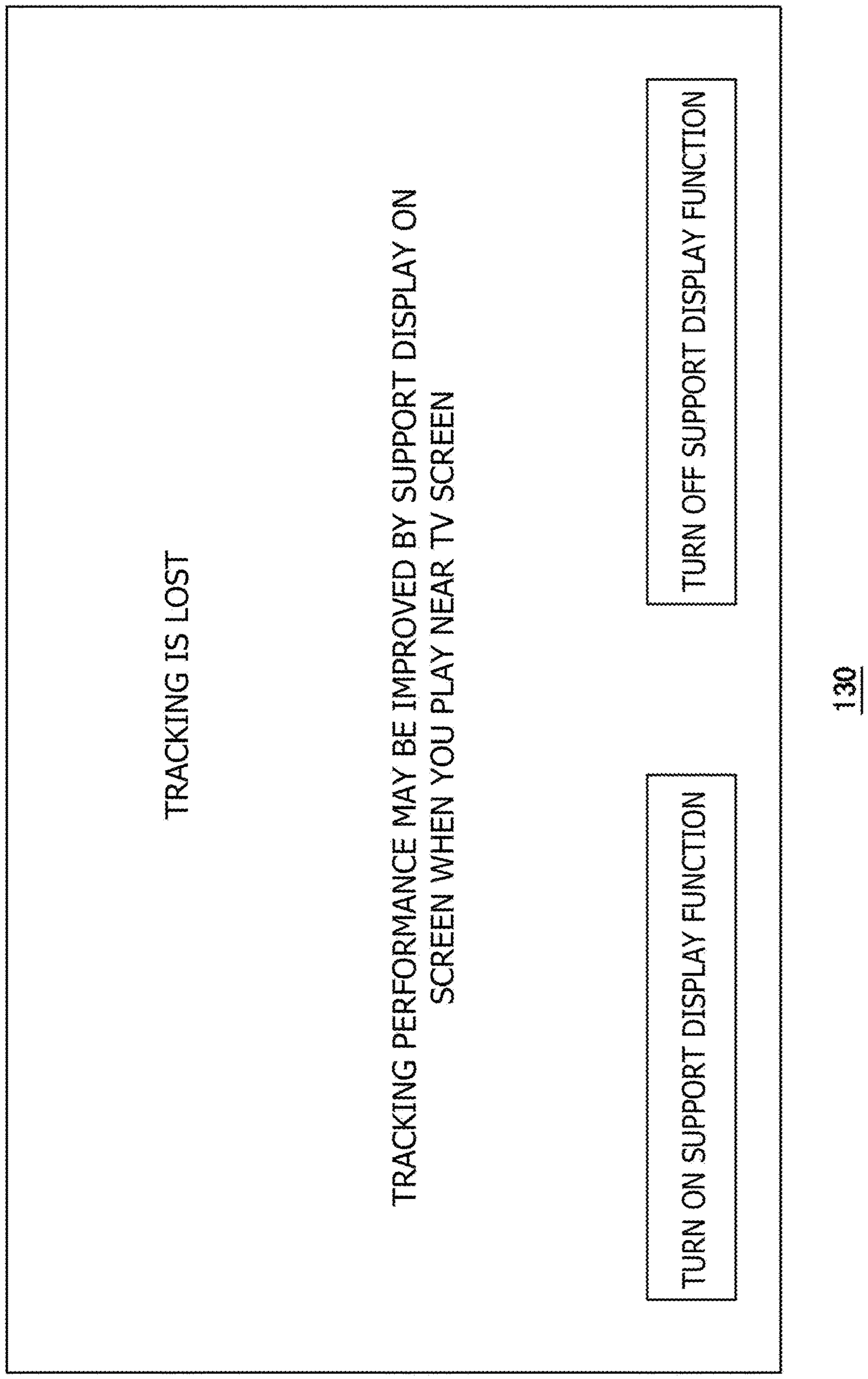
FIG. 9 is a view for illustrating an example of a setting screen displayed on the display panel.

FIG. 9 illustrates an example of the setting screen displayed on the display panel 130 during the game play. When the user selects an item "Turn ON support display function," the setting unit 220 changes the picture pattern display function by the TV image generation unit 234 to the ON setting, thereby setting the picture pattern display function to be enabled. As a result, the tracking accuracy is improved.

A description has been given of the present disclosure on the basis of the embodiment. The embodiment is illustrative, and it is to be understood by those who are skilled in the art that changes and variations may be made in the combinations of the components and the processing processes thereof and these changes and variations are also within the scope of the present disclosure. The information processing device 10 executes the estimation processing in the embodiment, but a part or all of the functions of the information processing device 10 may be provided in the HMD 100, and the HMD 100 may execute the estimation processing. On this occasion, the HMD 100 functions as the information processing device.

In the embodiment, the imaging devices 14 are attached to the HMD 100, but the imaging devices 14 are only required to image a space around the HMD 100 and may be attached to a position other than the HMD 100.

In a modification example, the setting unit 220 may dynamically set the picture pattern display function to be enabled or disabled. For example, the setting unit 220 sets the picture pattern display function to be enabled or disabled, on the basis of the distance between the output device 15 and the HMD 100. Specifically, the setting unit 220 may set the picture pattern display function to be enabled when the distance between the output device 15 and the HMD 100 is equal to or shorter than a predetermined length and may set the picture pattern display function to be disabled when the distance is longer than the predetermined length.

The setting unit 220 may set the picture pattern display function to be enabled or disabled, on the basis of an occupied ratio of the area of the output device 15 included in the captured image. Specifically, the setting unit 220 may set the picture pattern display function to be enabled when the occupied ratio of the area of the output device 15 is equal to or higher than a predetermined value and may set the picture pattern display function to be disabled when the occupied ratio is lower than the predetermined value.

Note that the screen size of the output device 15 and the distance between the output device 15 and the HMD 100 may be detected when the play area is set, and the setting unit 220 may recommend the user to set the picture pattern display function to be ON when the screen size is large and the distance is short. The screen size may be detected through the HDMI (high-definition multimedia interface) (registered trademark). The state in which the screen size is large and the distance is short may be determined on the basis of the occupied ratio of the area of the output device 15 included in the captured image of the imaging device 14.

Moreover, the setting unit 220 may select the picture pattern 70 to be displayed, according to the screen size of the output device 15. Specifically, a picture pattern 70 including a large pattern may be selected when the screen size is small, and a picture pattern 70 including a small pattern may be selected when the screen size is large. Note that the setting unit 220 may select the picture pattern 70 on the basis of the occupied ratio of the area of the output device 15 included in the captured image.

INDUSTRIAL APPLICABILITY

The present disclosure can be used in a technical field for generating a display image.

REFERENCE SIGNS LIST

1: Information processing system
10: Information processing device
14: Imaging device
15: Output device
70: Picture pattern
72: Game moving image
100: HMD
200: Processing unit
202: Communication unit
210: Acquisition unit
212: Captured image acquisition unit
214: Sensor data acquisition unit
216: Operation information acquisition unit
220: Setting unit
222: Estimation processing unit
224: Game execution unit
230: Image generation unit
232: HMD image generation unit
234: TV image generation unit

The invention claimed is:

1. An information processing device comprising:

one or more processors; and a non-transitory memory storing computer readable instructions that, when executed by the one or more processors, cause the one or more processors to at least:

estimate a position, a posture, or both position and posture of a head-mounted display (HMD) on a basis of an image obtained by capturing a vicinity of the head-mounted display; and generate a display image to be displayed on a display device different from the head-mounted display, wherein;

the display image includes a frame formed of a picture pattern as a still image and a moving image displayed inside the frame, the picture pattern including a plurality of corner portions for extraction as feature points for tracking the HMD and being generated during estimation of the one or more of the position and the posture of the HMD, and estimating one or more of the position and the posture of the HMD includes:

capturing additional images of the vicinity of the HMD including the display image, and estimating the one or more of the position and the posture of the HMD on the basis of the plurality of corner portions of the picture pattern included in the additional images.

2. The information processing device of claim 1, wherein:

generating the display image includes generating a HMD display image, and the moving image displayed inside the frame of the display image includes the HMD display image.

3. The information processing device of claim 1, wherein the picture pattern does not repeat a same pattern at close positions.

4. The information processing device of claim 1, wherein the picture pattern includes a still image on at least one of an upper side, a lower side, a left side, and a right side.

5. The information processing device of claim 1, wherein the one or more processors are further configured to:

generate the display image including the picture pattern while a user is wearing the head-mounted display on a head portion, and not generate the display image including the picture pattern while the user is not wearing the head-mounted display on the head portion.

6. The information processing device of claim 1, wherein the computer readable instructions further cause the one or more processors to switch a picture pattern display function between an enabled status, in which the frame formed of the picture pattern is displayed, and a disabled status, in which the frame is not displayed.

7. The information processing device according to claim 6, wherein, when the estimating of the at least one of the position and the posture of the HMD fails, the one or more processors are further caused to at least one of:

enable the picture pattern display function, and generate a display image for display on the head-mounted display, the display image including an option for setting the picture pattern display function to be enabled.

8. An image generation method comprising:

estimating a position, a posture, or both position and posture of a head-mounted display (HMD) on a basis of an image obtained by capturing a vicinity of the head-mounted display;

generating a display image to be displayed on a display device different from the head- mounted display, wherein the display image includes a frame formed of a picture pattern as a still image and a moving image displayed inside the frame, the picture pattern including a plurality of corner portions for extraction as feature points for tracking the HMD and being generated during estimation of the one or more of the position and posture of the HMD;

capturing additional images including the vicinity of the HMD including the display image; and estimating of the one or more of the position and the posture of the HMD on the basis of the plurality of corner portions of the picture pattern included in the additional images.

9. A non-transitory computer readable medium having instructions stored thereon that, when executed by one or more processors, cause the one or more processors to:

estimate a position, a posture, or both position and posture of a head-mounted display (HMD) on a basis of an image obtained by capturing a vicinity of the head-mounted display;

generate a display image to be displayed on a display device different from the head-mounted display, wherein the display image includes a frame formed of a picture pattern as a still image and a moving image displayed inside the frame, the picture pattern including a plurality of corner portions for extraction as feature points for tracking the HMD and being generated during estimation of the one or more of the position and posture of the HMD;

capture additional images of the vicinity of the HMD including the display image; and estimate the one or more of the position and the posture of the HMD on the basis of the plurality of corner portions of the picture pattern included in the additional images.

* * * * *